United States Patent
Hodge et al.

(10) Patent No.: US 10,430,247 B2
(45) Date of Patent: *Oct. 1, 2019

(54) BLUEPRINT-DRIVEN ENVIRONMENT TEMPLATE CREATION IN A VIRTUAL INFRASTRUCTURE

(71) Applicant: EMC Corporation, Hopkinton, MA (US)

(72) Inventors: Randolph A. Hodge, Danville, CA (US); Alex Rankov, Danville, CA (US); Sameer Mukund Kachare, Dublin, CA (US); Serghei Sepelevici, Chisinau (MD); Alexei Nikulin, Kharkov (UA); Akkina Kranthi Kiran, Bangalore (IN); Sunil Digvijay Kashikar, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,148

(22) Filed: Apr. 22, 2015

(65) Prior Publication Data

US 2015/0370607 A1 Dec. 24, 2015

Related U.S. Application Data

(63) Continuation of application No. 13/538,392, filed on Jun. 29, 2012, now Pat. No. 9,043,786.

(51) Int. Cl.
*G06F 9/50* (2006.01)
*G06F 9/455* (2018.01)
*G06F 9/48* (2006.01)

(52) U.S. Cl.
CPC ........ *G06F 9/5077* (2013.01); *G06F 9/45533* (2013.01); *G06F 9/45558* (2013.01); *G06F 9/4856* (2013.01); *G06F 2009/4557* (2013.01); *G06F 2009/45562* (2013.01)

(58) Field of Classification Search
None
See application file for complete search history.

(56) References Cited

U.S. PATENT DOCUMENTS 8,335,851 B1    12/2012   Vendrow
2008/0163194 A1*  7/2008   Dias ...................... G06F 9/5077
                                                          717/174

(Continued)

OTHER PUBLICATIONS

Final Office Action for U.S. Appl. No. 14/663,723, dated Dec. 15, 2016.

(Continued)

*Primary Examiner* — Wynuel S Aquino
(74) *Attorney, Agent, or Firm* — Van Pelt, Yi & James LLP

(57) ABSTRACT

A system for blueprint-driven environment template creation in a virtual infrastructure comprises a processor and a memory. The processor is configured to receive a blueprint, receive an environment template configuration, and build an environment template using the blueprint and the environment template configuration. The environment template is for provisioning an environment. The environment is for deploying an application. The memory is coupled to the processor and is configured to provide the processor with instructions.

22 Claims, 11 Drawing Sheets

(56) References Cited

U.S. PATENT DOCUMENTS

| | | | |
|---|---|---|---|
| 2010/0036723 A1* | 2/2010 | Hubbard | G06F 9/5044 |
| | | | 705/14.14 |
| 2010/0313185 A1* | 12/2010 | Gupta | G06F 8/60 |
| | | | 717/124 |
| 2011/0126207 A1 | 5/2011 | Wipfel | |
| 2012/0110571 A1* | 5/2012 | Smith | G06F 9/445 |
| | | | 718/1 |
| 2012/0173709 A1 | 7/2012 | Li | |
| 2012/0311571 A1 | 12/2012 | Morgan | |
| 2013/0054948 A1 | 2/2013 | Raj | |
| 2013/0132950 A1 | 5/2013 | McLeod | |
| 2013/0232480 A1* | 9/2013 | Winterfeldt | G06F 8/60 |
| | | | 717/177 |

OTHER PUBLICATIONS

Office Action for U.S. Appl. No. 14/663,723, dated Apr. 21, 2016.

\* cited by examiner

```
Blueprint

Cluster:    RepositoryVM
                max-vms = 10
                min-vms = 2
                default-vms = 4

Cluster:    SearchVM
                max-vms = 1
                min-vms = 1
                default-vms = 1

Service:    RepositoryService
                cluster = RepositoryVM
                service-type = RepositoryServiceType Endpoint: RepositoryEndpoint
                endpoint-type = RepositoryAccess Component: ContentServer
                service-component-type = ContentServerType
                Property: docbase.id = 187
                Property: appserver.base.port = 9180
```

BLUEPRINT-DRIVEN ENVIRONMENT TEMPLATE CREATION IN A VIRTUAL INFRASTRUCTURE

CROSS REFERENCE TO OTHER APPLICATIONS

This application is a continuation of co-pending U.S. patent application Ser. No. 13/538,392, entitled BLUEPRINT-DRIVEN ENVIRONMENT TEMPLATE CREATION IN A VIRTUAL INFRASTRUCTURE filed Jun. 29, 2012 which is incorporated herein by reference for all purposes.

BACKGROUND OF THE INVENTION

Large organizations need to do a great deal of electronic record keeping, utilizing large and complex systems, requiring extensive hardware and software infrastructure. Example systems include a university system for tracking applications and enrolled student histories, an insurance company system for tracking clients and insurance claims, or a police department system for tracking information relevant to active cases and to individual criminal histories. Each of these systems may be used by many people simultaneously, possibly spread across a large physical area, and need to track a large number of documents across a long period of time. Each system additionally requires specific software to serve the needs of the organization effectively. When a large organization commissions a new system of this type, typically a group of application design, system administrator, and system architecture experts is brought in to design the software and the infrastructure (e.g., the hardware on which the software runs), and then to scale the system into production use. Designing the infrastructure is a complex task, and depends on the needs of the organization in many ways. Each resulting system is different, causing it to take a great deal of time to thoroughly build and test new systems. When problems occur and software support becomes involved, it may take a significant effort even to communicate the relevant details of the infrastructure setup so troubleshooting can begin.

BRIEF DESCRIPTION OF THE DRAWINGS

Various embodiments of the invention are disclosed in the following detailed description and the accompanying drawings.

FIG. 3 is a diagram illustrating an embodiment of a blueprint.

DETAILED DESCRIPTION

Figure 1:
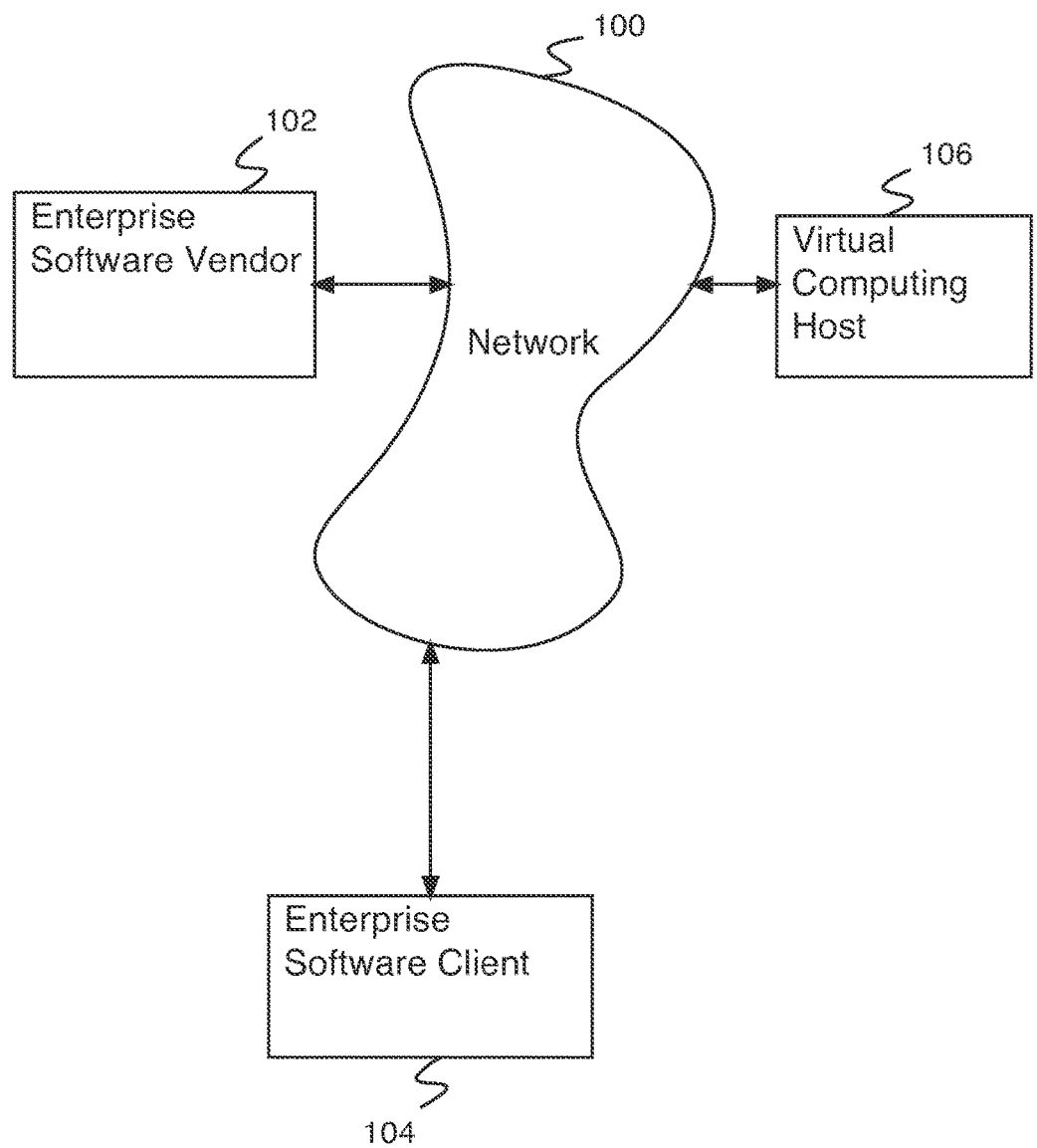
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Blueprint-driven environment template construction in a virtual infrastructure is disclosed. A system for blueprint-driven environment template creation in a virtual infrastructure comprises a processor configured to receive a blueprint; receive an environment template configuration; and build an environment template using the blueprint and the environment template configuration, wherein the environment template is for provisioning an environment, and wherein the environment is for running a deployed application. The system for blueprint-driven environment template creation in a virtual infrastructure additionally comprises a memory coupled to the processor and configured to provide the processor with instructions.

Environment-driven application deployment in a virtual infrastructure is disclosed. The system for recipe and blueprint-driven automated application deployment comprises a processor configured to receive an environment, wherein the environment is provisioned using an environment template, and wherein the environment template is built using a blueprint; receive an application package, wherein the application package comprises an application artifacts and configuration; and deploy an application using the environment and the application package. The system for recipe and blueprint-driven automated application deployment additionally comprises memory coupled to the processor and configured to provide the processor with instructions.

Environment template-driven environment provisioning in a virtual infrastructure is disclosed. A system for automated provisioning of heterogeneous virtual environments comprises a processor configured to receive an environment template, wherein the environment template is built using a blueprint; receive an environment configuration, wherein the environment configuration comprises environment sizing values and one or more environment endpoints, and provision an environment using the environment template and the environment configuration, wherein the environment is for running a deployed application. A system for automated provisioning of heterogeneous virtual environments additionally comprises a memory coupled to the processor and configured to provide the processor with instructions.

In some embodiments, when a hardware infrastructure for a suite of document management software is created, the first step is to procure a set of server computers. Different choices in number, type, or configuration of server computers led to implementation differences and possible problems. It is not feasible to specify a standard hardware configuration due to the different needs of different users and the continually shifting hardware market. When working with a virtual infrastructure, however, the situation changes. In a virtual infrastructure, computing resources are supplied by a computing host abstraction layer and requested by the application administrators. Physical hardware is no longer the concern of the application administrators, they simply request new machines and they are supplied. Two new machines requested under the same set of specifications are guaranteed to perform identically. A supplier of a runtime software framework can thus issue guidelines comprising recommendations describing the number and configuration of virtual machines necessary for a given application. Several sets of guidelines can be published, covering the needs of differently sized clients, and the guidelines can be customized to meet the specific needs of each client without losing the basic consistency of the infrastructure. When the client requests resources according to the guidelines the infrastructure will behave in a well-understood manner.

In some embodiments, a process for creating a new virtual environment begins with a blueprint. The blueprint is a document issued by a supplier of a software framework that describes aspects of the virtual environment. It allows creation of the virtual environment to be automated, reducing setup costs, and ensures that there is a basic level of consistency between virtual environments, reducing maintenance costs. In some embodiments, a blueprint comprises a computer-readable markup document (e.g., an XML document) that can be processed directly by software. The blueprint includes information describing the number of virtual machines to create, virtual machine configuration instructions, virtual machine cluster settings (e.g., whether to use virtual machine clusters, default, maximum and minimum number of virtual machines for each cluster, etc.), network connectivity settings of the virtual machines (e.g., IP address settings, port settings, administrator settings, hostname settings, etc.), what software to install on the virtual machines, software configuration instructions, server functionality (e.g., which virtual servers perform which functions), or any other appropriate environment information. After the blueprint is received from the software framework supplier, it may be altered before it is further processed. For example, the blueprint may be altered to remove unneeded functionality, to increase the size or number of virtual machines used, to remove virtual machine clustering, or for any other appropriate reason. After the blueprint is downloaded and modified as desired, it is processed by software created by the software supplier to build the foundation of the virtual environment called an environment template. Building an environment template comprises following the rules dictated in the blueprint to instantiate a set of virtual machines, configure them, install software on them, and persist the resulting virtual machines as a single manageable unit used to subsequently provision one or more environments.

The process of building an environment template from a blueprint comprises receiving an environment template configuration. In some embodiments, an environment template configuration comprises a set of configurations to be applied to the environment template building process. In various embodiments, an environment template configuration configures a list of virtual machine clusters into which software will be installed, a default resource allocation to each virtual machine, a default initial number of virtual machines in a virtual machine cluster, a default minimum number of virtual machines in a virtual machine cluster, a default maximum number of virtual machines in a virtual machine cluster, what software is installed onto virtual machines in a virtual machine cluster, binding of application services to virtual machines in a virtual machine cluster, which virtual machine services in a virtual machine cluster depend on systems outside the virtual machine cluster, the operating system on each virtual machine in a virtual machine cluster, or any other appropriate environment template parameters.

In some embodiments, virtual machines instantiated in the environment template are based on a default virtual machine template that is processed along with the blueprint. A default virtual machine template is created with an operating system and any other desired modules installed in order to meet the specifications of the organization. For instance, an organization might require a specific version of Windows, specific third-party antivirus software, or a specific set of configurations to be made. Creation of the environment template from the blueprint and the default virtual machine template causes the default virtual machine template to be instantiated as many times as is requested in the blueprint. The set of virtual machines is stored as part of the created environment template. Organizations are then able to ensure that all virtual machines used in the instantiated environments meet their specifications.

In some embodiments, the environment template comprises a virtual application including all of the requested virtual machines with software installed according to the blueprint instructions. It is not yet a running virtual environment but a clean environment build that can be replicated onto cloud computing hardware one or more times to create functioning virtual environments in which to work. For example, an organization operating across multiple sites can use a single environment template to ensure that the infrastructures for the different sites are identical. A typical development process for an application includes three environment templates created to streamline the application scaling process. A first environment template comprises a minimal install for use by application developers without consumption of unnecessary resources. A second environment template comprises a basic install for application testing purposes as development proceeds. A third environment template comprises a full production install for running the application under a full load. Building the environment templates beforehand allows infrastructure scaling to proceed in a known way not subject to the variables associated with acquiring hardware.

In some embodiments, provisioning of an environment comprises instantiation of an environment template into a functioning infrastructure. In some embodiments, software created by the software supplier is used for provisioning of an environment. An initial step of the provisioning process is instantiation of a content repository, e.g., a server for storing various forms of documents and media. In some embodiments, the content repository is not included as part of the blueprint and environment template because each content repository needs to be instantiated with a unique repository identifier. For instance, if the content repository were included in the environment template it would be cloned for each provisioning of the environment template, causing the identifier of each document repository to be identical and leading to software errors if the environment template were provisioned more than once.

In some embodiments, when provisioning continues, each virtual machine is installed on a virtual hardware module supplied by the computing host. The virtual machines are then configured to network with one another and with the content repository. This process includes configuration of specific virtual machines to host specific pieces of software (e.g., one machine hosts the content server software, one machine hosts the content search engine software, one machine hosts the content transformation software, etc.) and configuration of each virtual machine with information describing which virtual machine to contact for each piece of functionality. Each provisioning operation made is logged into a runtime log file stored as part of the system. This log file captures the entire state of the virtual infrastructure as installed, and can be analyzed by a system administrator as part of a troubleshooting process should there be a later problem with the system. System monitoring software can be automatically installed and configured on each virtual machine as part of the provisioning process, in order to capture the state of the infrastructure as time proceeds and provide further information to the system administrator.

In some embodiments, the process of provisioning an environment from an environment template comprises receiving an environment configuration. In some embodiments, an environment configuration comprises a set of configurations to be applied to the environment provisioning process. In various embodiments, the environment configuration configures the environment template, environment-specific software values, virtual machine cluster sizes, connections from virtual machines in a virtual machine cluster to systems outside the virtual machine cluster, virtual machine accounts, or any other appropriate environment parameters.

In some embodiments, after an environment has been provisioned, a software application developer can begin to develop a software application specific to the organization. A software application typically requires numerous modifications to be made to the environment. Software artifacts are left on the content repository and on the various virtual machines enabling the software application to take full advantage of the virtual infrastructure. When the software application is complete, it is wrapped by the software application developer into an application package, including all of the appropriate software artifacts. The application package can then be deployed by a system administrator onto one or more provisioned environments. In some embodiments, software created by the software supplier is used for deploying an application package. When an application package is deployed, software artifacts located in the application package are placed by the deployment software into their appropriate locations in the environment. The deployment software is able to perform this task effectively, even if the target environment is different from the original one (e.g., different environments used for development, testing, and production) because the environments were provisioned from environment templates built from blueprints. All aspects of the environment are kept consistent as the scale is increased, allowing the software to accurately place software artifacts throughout the environment as the application is deployed.

In some embodiments, the process of deploying an application into an environment includes receiving an application configuration. In some embodiments, an application configuration comprises a set of configurations to be applied to the application deployment process. In various embodiments, the application configuration configures connections from applications running on virtual machines in a virtual machine cluster to systems outside the virtual machine cluster, the application package to deploy, the target deployment environment, application parameter values, or any other appropriate application parameters.

In some embodiments, application parameters comprise parameters that can be specified for an application when deploying the application. For example, in the event that the application is a loan approval application where the application has a parameter value for a jumbo loan. The application can be deployed with a specified jumbo loan value as part of an application configuration.

In some embodiments, an important aspect to creation of a system in an environment is the ability to connect system elements with external elements. In some embodiments, an environment endpoint comprises information to connect system elements to an external element or the external element that the system element is to connect to. In some embodiments, an important aspect to creation of an application in an environment is the ability to connect the application with external elements. In some embodiments, an application endpoint comprises information to connect an application to an external element or the external element that the application is to connect to.

FIG. 1 is a block diagram illustrating an embodiment of a network system. In some embodiments, the system of FIG. 1 comprises a network system for blueprint-driven environment template creation in a virtual infrastructure. In some embodiments, the system of FIG. 1 comprises a network system for recipe and blueprint-driven automated application deployment. In some embodiments, the system of FIG. 1 comprises a network system for automated provisioning of heterogeneous virtual environments. In the example shown, FIG. 1 comprises network 100. In various embodiments, network 100 comprises one or more of the following: a local area network, a wide area network, a wired network, a wireless network, the Internet, or any other appropriate network. Enterprise software vendor 102, enterprise software client 104, and virtual computing host 106 communicate via network 100. Enterprise software vendor 102 comprises an enterprise software vendor providing enterprise software, e.g., to enterprise software client 104. In some embodiments, enterprise software vendor 102 provides a enterprise software framework, e.g., a system within which enterprise software applications can be efficiently created. In some embodiments, enterprise software vendor 102 provides a enterprise software framework executing on computers owned by enterprise software client 104. In some embodiments, enterprise software vendor provides a enterprise software framework executing on virtual computers hosted by virtual computing host 106. In some embodiments, enterprise software vendor 102 provides recommendations regarding the instantiation of virtual computers hosted by virtual computing host 106. In some embodiments, enterprise software vendor 102 provides a blueprint dictating the virtual computers to be hosted by virtual computing host 106 for a given application or application type. In some embodiments, a blueprint provided by enterprise software vendor 102 is processed by enterprise software client 104 to create an environment template. In some embodiments, an environment template created by enterprise software client 104 is installed on virtual computing host 106 to create a virtual environment for running an enterprise application.

In some embodiments, enterprise software client 104 comprises a client for an enterprise software application. In some embodiments, enterprise software client 104 comprises a client for a custom enterprise software application. In some embodiments, enterprise software client 104 utilizes a enterprise software application provided by enterprise software vendor 102 and installed in a virtual environment hosted by virtual computing host 106. In some embodiments, virtual computing host 106 comprises virtual computing hardware owned by enterprise software client 104. In some embodiments, virtual computing host 106 comprises virtual computing hardware owned by enterprise software vendor 102. In some embodiments, virtual computing host 106 comprises virtual computing hardware owned by an external virtual computing host, e.g., in the cloud.

Figure 2:
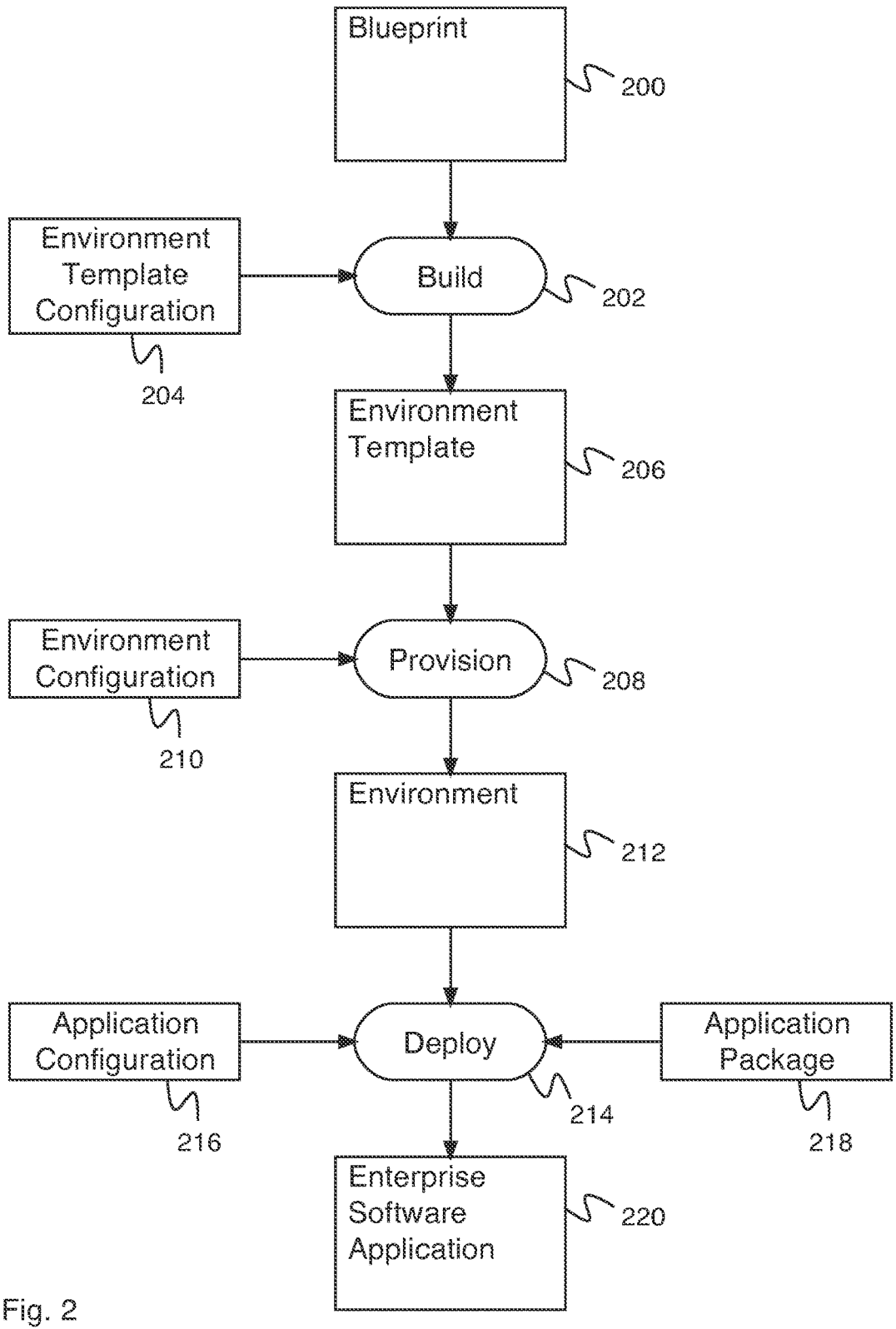
FIG. 2 is a block diagram illustrating a set of software transformations.

FIG. 2 is a block diagram illustrating a set of software transformations. In some embodiments, the software transformations of FIG. 2 are performed by software provided by enterprise software vendor 102 of FIG. 1, executed by enterprise software client 104 of FIG. 1 to create a virtual environment on virtual computing host 106 of FIG. 1. In the example shown, build 202 uses blueprint 200 to create environment template 206. The blueprint comprises a set of system details for a given kind of environment, e.g., software components intended to run in the environment, virtual machines needed to run all software components, the allocation or binding of software components to virtual machines, default memory and central processing unit (CPU) sizing of virtual machines, and default sizing of virtual machine clusters. In some embodiments, these details will differ between or across different kinds of environments (for example, development environments, test environments, staging environments, production environments, or any other appropriate kind of environments). The environment template is derived from the blueprint and comprises a set of instantiated virtual machines each with software components installed per the rules dictated in the blueprint. The environment template serves as the foundation for subsequently provisioned environments. In some embodiments, blueprint 200 is received from an enterprise software vendor. In some embodiments, building environment template 206 comprises building and configuring a set of virtual machines based on instructions in blueprint 200. In some embodiments, the process of building environment template 206 is affected by environment template configuration 204. In some embodiments, the enterprise software client provides environment template configuration 204 to customize the process of building environment template 206. In the example shown, provision 208 installs environment template 206 to create environment 212. The environment comprises a set of virtual machines instantiated from the environment template, and the set of virtual machines comprising all software services required to run a deployed application. In some embodiments, provisioning environment 212 comprises installing the virtual machines comprising environment template 206 on a virtual computing host. In some embodiments, the process of provisioning environment 212 is affected by environment configuration 210. In some embodiments, the enterprise software client provides environment template configuration 210 to customize the process of provisioning environment 212. In the example shown, deploy 214 installs application package 218 onto environment 212 to create enterprise software application 220. In some embodiments, deploying enterprise software application 220 comprises installing application package 218 onto the virtual machines comprising environment 212. In some embodiments, the process of deploying enterprise software application 220 is affected by application configuration 216. In some embodiments, the enterprise software client provides application configuration 216 to customize the process of deploying enterprise software application 220. The enterprise software application comprises a set of runtime computer program artifacts orchestrated and executed on an ongoing basis to address a particular set of customer requirements.

FIG. 3 is a diagram illustrating an embodiment of a blueprint. In some embodiments, blueprint 300 is received by enterprise software client 104 of FIG. 1 from enterprise software vendor 102 of FIG. 1 for describing a virtual environment eventually to be instantiated on virtual computing host 106 of FIG. 1. In some embodiments, blueprint 300 comprises blueprint 200 of FIG. 2. In some embodiments, blueprint 300 comprises a description of a virtual environment for an enterprise application. In some embodiments, blueprint 300 is used to build an environment template. In some embodiments, blueprint 300 comprises the input to a software program used to build an environment template.

In the example shown, blueprint 300 comprises a text description. In various embodiments, blueprint 300 comprises a text file, an extensible markup language (XML) file, a shell script, code to be interpreted (e.g., perl code, ruby code, python code, etc.), code to be compiled (e.g., C code, C++ code, Java™ code, etc.), compiled machine code, an executable binary file, or any other appropriate kind of file. In some embodiments, blueprint 300 is modifiable by a user. In the example shown, blueprint 300 comprises a set of descriptions of computing resources and computing services. Blueprint 300 describes computing resources comprising two virtual machine clusters, a cluster named RepositoryVM and a cluster named SearchVM. In some embodiments, computing resources comprise virtual machine clusters, e.g., groups of virtual machines that can change size to adapt to changing demand. In various embodiments, a description of a virtual machine cluster comprises a maximum number of virtual machines, a minimum number of virtual machines, a default number of virtual machines, a number of CPUs, a quantity of memory, a virtual machine template, or any other appropriate cluster description. In various embodiments, computing resources comprise virtual data centers, virtual servers, individual virtual machines, virtual machine clusters, or any other appropriate computing resources. Blueprint 300 describes computing services comprising a service called RepositoryService. In various embodiments, computing services comprise RepositoryService (e.g., a storage service), SearchService (e.g., a search service), AppHostService (e.g., an application hosting service), BamService (e.g., business activity monitoring service), MobileService (e.g., a mobile device interaction service, a cell phone network interaction service), DaService (e.g., directory assistance service), CisService (e.g., content intelligence service), CtsService (e.g., content transformation service), BpsService (e.g., business process service), or any other appropriate service type. In the example shown, the RepositoryService description comprises a cluster name, a service type, an endpoint name and type, a component name and type, and two component properties with associated values. In various embodiments, a service description includes a service name, a computing resource (e.g., a cluster, server, virtual machine, etc.) associated with the service, a service type, a service type version, an endpoint name, an endpoint type, a component name, a component type, a component property value, a dependency name, a dependency local endpoint, a dependency endpoint type, an operating system type, or any other appropriate service description.

Figure 4:
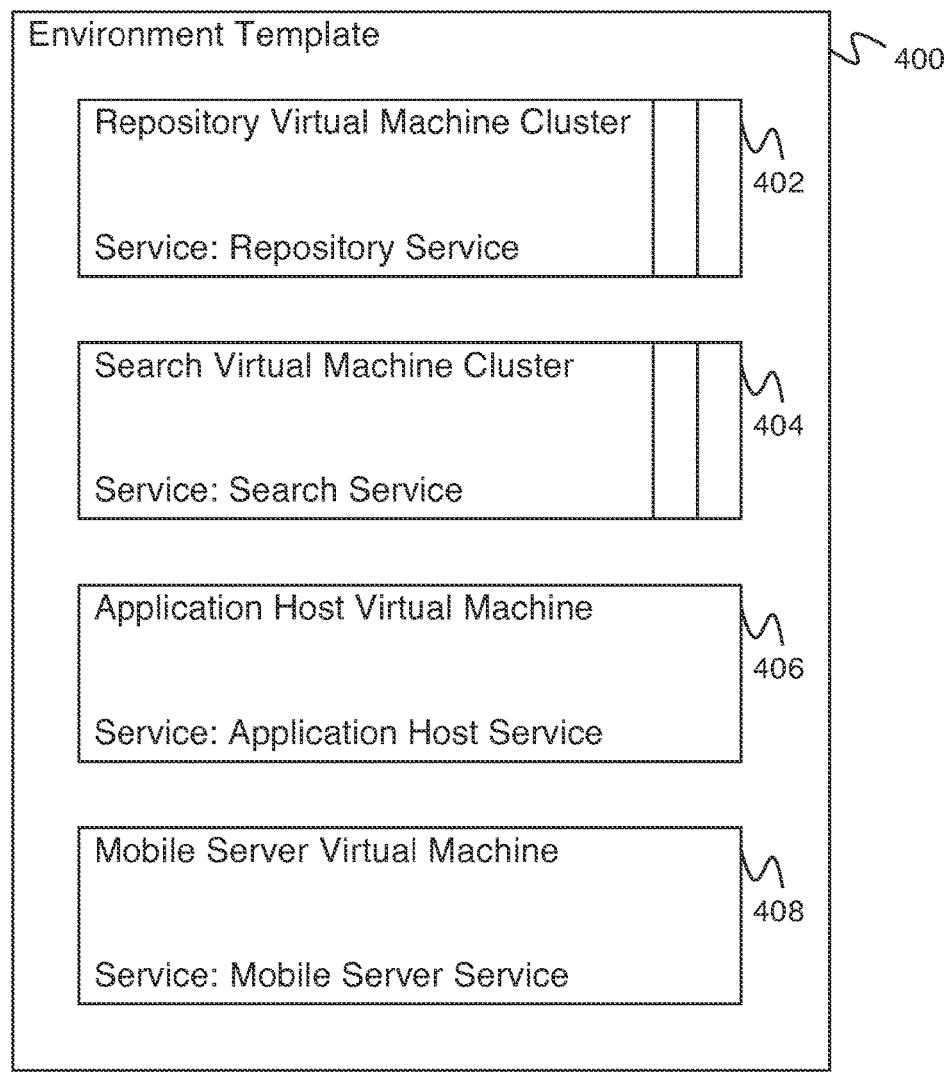
FIG. 4 is a block diagram illustrating an embodiment of an environment template.

FIG. 4 is a block diagram illustrating an embodiment of an environment template. In some embodiments, environment template 400 is built by enterprise software client 104 of FIG. 1 from a blueprint received from enterprise software vendor 102 of FIG. 1 for describing a virtual environment eventually to be provisioned on virtual computing host 106 of FIG. 1. In some embodiments, environment template 400 comprises template 206 of FIG. 2. In some embodiments, environment template 400 is built from a blueprint (e.g., blueprint 300 of FIG. 3). In some embodiments, environment template 400 is built by a software program using a blueprint as input. In some embodiments, a software program used for building environment template 400 from a blueprint additionally receives a default virtual machine template as input. In some embodiments, a software program used for building environment template 400 from a blueprint additionally receives an environment template configuration as input.

In some embodiments, the template configuration includes only two things: which blueprint to use and the name that will be applied to the template about to be created. In some embodiments, the blueprint comprises a set of configurations to be applied to the environment template building process. In various embodiments, a blueprint configures a list of virtual machine clusters into which software will be installed, a default resource allocation to each virtual machine, a default initial number of virtual machines in a virtual machine cluster, a default minimum number of virtual machines in a virtual machine cluster, a default maximum number of virtual machines in a virtual machine cluster, what software is installed onto virtual machines in a virtual machine cluster, binding of application services to virtual machines in a virtual machine cluster, which virtual machine services in a virtual machine cluster depend on systems outside the virtual machine cluster, the operating system on each virtual machine in a virtual machine cluster, or any other appropriate environment template parameters.

In some embodiments, environment template 400 is used to provision an environment. In some embodiments, environment template 400 comprises the input to a software program used to provision an environment. In some embodiments, environment template 400 comprises a computer file. In various embodiments, environment template 400 comprises virtual machine instantiations, virtual machine cluster instantiations, virtual machine server instantiations, virtual machine data center instantiations, or any other appropriate virtual machine instantiations. Virtual machines comprising environment template 400 additionally comprise installed software. In various embodiments, virtual machines comprising environment template 400 comprise installed application software, installed operating system software, installed database software, installed drivers, installed communications modules, installed configurations, installed virtual hardware, or any other appropriate installed software. Virtual machines comprising environment template 400 additionally comprise service configurations. In some embodiments, a service configuration comprises an indication of service functionality of a virtual machine. In various embodiments, service configurations comprise repository service configurations, search service configurations, application host service configurations, mobile server service configurations, business activity monitoring service configurations, administrative service configurations, content intelligence service configurations, content transformation service configurations, business process integration service configurations, or any other appropriate service configurations. In various embodiments, virtual machines comprising environment template 400 comprise random-access memory (RAM) configurations, storage configurations, network hardware configurations, CPU configurations, cluster configurations, or any other appropriate configurations.

In the example shown, environment template 400 comprises repository virtual machine cluster 402, search virtual machine cluster 404, application host virtual machine 406, and mobile server virtual machine 408. Repository virtual machine cluster 402 comprises a virtual machine cluster configured as a repository service. Search virtual machine cluster 404 comprises a virtual machine cluster configured as a search service. Application host virtual machine 406 comprises a virtual machine configured as an application host service. Mobile server virtual machine 408 comprises a virtual machine configured as a mobile server service.

Figure 5:
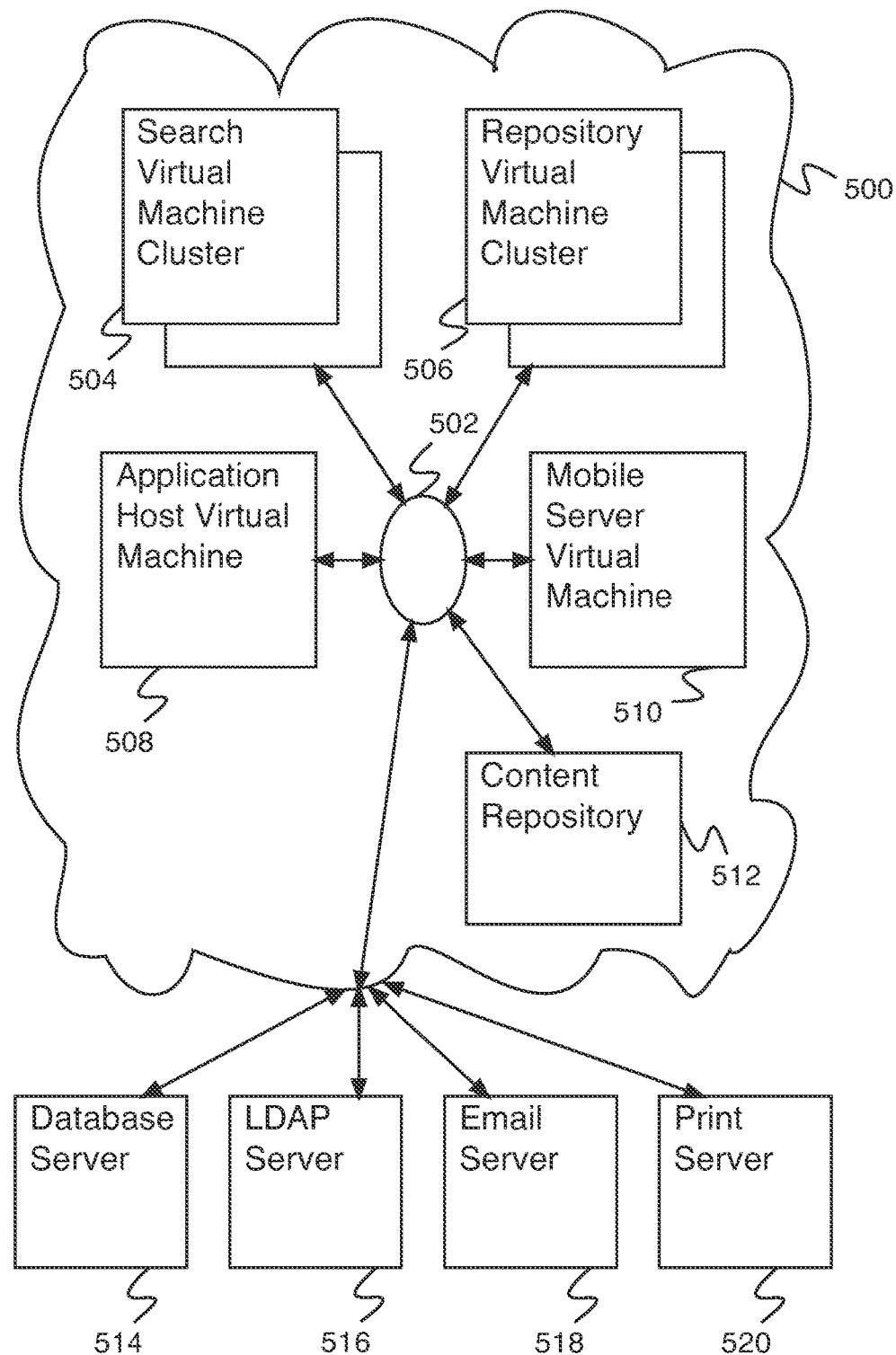
FIG. 5 is a block diagram illustrating an embodiment of a virtual environment.

FIG. 5 is a block diagram illustrating an embodiment of a virtual environment. In some embodiments, environment 500 is instantiated on virtual computing host 106 of FIG. 2 from an environment template built by enterprise software client 104 of FIG. 2 from a blueprint received from enterprise software vendor 102 of FIG. 2. In some embodiments, environment 500 comprises environment 212 of FIG. 2. In some embodiments, environment 500 comprises a virtual environment for an application. A virtual environment for an application comprises one or more virtual computing resources (virtual machines, virtual machine clusters, virtual machine servers, virtual machine data centers, etc.), each comprising installed software and configurations. In some embodiments, a virtual environment for an application comprises a content repository service. In various embodiments, a virtual environment for an application comprises a search service, an administrative service, a business activity monitoring service, a process engine service, a content transformation service, or any other appropriate services required by the application.

In some embodiments, environment 500 is provisioned from an environment template. In some embodiments, environment 500 is provisioned by a software program using an environment template as input. In some embodiments, a software program used for provisioning environment 500 from an environment template additionally receives an environment configuration as input. In various embodiments, the environment configuration configures the provisioned environment, environment-specific software values, virtual machine cluster sizes, connections from virtual machines in a virtual machine cluster to systems outside the virtual machine cluster, virtual machine accounts, or any other appropriate environment parameters. In some embodiments, an application is deployed on environment 500.

Provisioning environment 500 from an environment template comprises generation of virtual hardware by a virtual computing host and instantiation of each of the virtual machines comprised by the environment template onto the virtual hardware. In some embodiments, provisioning environment 500 additionally comprises creation of a content repository, including a repository identifier. Provisioning environment 500 additionally comprises instantiating internetworking connections among the virtual machines and the content repository. In some embodiments, provisioning environment 500 additionally comprises installing internetworking connections between virtual machines comprising environment 500 and computers external to environment 500. In some embodiments, provisioning environment 500 additionally comprises configuring virtual machines comprising environment 500. In some embodiments, provisioning environment 500 additionally comprises installing system monitoring software. In some embodiments, provisioning environment 500 additionally comprises writing a list of operations to a provisioning log. An environment endpoint comprises information needed for services in a given environment to interact with systems external to the environment. In various embodiments environment endpoints include information related to external database systems, applications, email systems, directory servers, web services, or any other appropriate external systems.

In the example shown, environment 500 comprises internetworking 502. In some embodiments, internetworking 502 allows the elements of environment 500 to communicate with one another. Environment 500 additionally comprises search virtual machine cluster 504. In some embodiments, search virtual machine cluster 504 comprises a virtual machine cluster including document searching software. Environment 500 additionally comprises repository virtual machine cluster 506. In some embodiments, repository virtual machine cluster 506 comprises a virtual machine cluster including repository access software. Environment 500 additionally comprises application host virtual machine 508. In some embodiments, application host virtual machine 508 comprises a virtual machine including application host software. Environment 500 additionally comprises mobile server virtual machine 510. In some embodiments, mobile server virtual machine 510 comprises a virtual machine including mobile server software. Environment 500 additionally comprises content repository 512. In some embodiments, content repository 512 comprises a data structure and service for storing content accessed by an application. In some embodiments, content repository 512 comprises a virtual machine. In some embodiments, content repository 512 comprises a data structure and service stored on a shared virtual machine (e.g., repository virtual machine cluster 506, application host virtual machine 508, or any other appropriate virtual machine). In some embodiments, environment 500 additionally communicates with external computers. In the example shown, environment 500 communicates with database server 514. In some embodiments, database server 514 comprises a database server for physical storage of content metadata (e.g., the content stored in content repository 512). In the example shown, environment 500 communicates with Lightweight Directory Access Protocol (LDAP) server 516. In some embodiments, LDAP server comprises an LDAP server for serving directory access requests. In the example shown, environment 500 communicates with email server 518. In some embodiments, email server comprises an email server for sending and receiving email (e.g., to other locations on the Internet). In the example shown, environment 500 communicates with print server 520. In some embodiments, print server 520 comprises a print server for printing documents.

In some embodiments, an application is deployed on environment 500. In some embodiments, deploying an application on environment 500 comprises installing an application on application host virtual machine 508. In some embodiments, deploying an application on environment 500 comprises installing software or configurations on repository virtual machine cluster 506 for interacting with an application executing on application host virtual machine 508. In various embodiments, deploying an application on environment 500 comprises installing software or configurations on one or more of search virtual machine cluster 504, repository virtual machine cluster 506, application host virtual machine 508, mobile server virtual machine 510, document repository 512, or any other appropriate virtual computing device of environment 500. In some embodiments, deploying an application on environment 500 comprises installing software and configurations on one or more virtual computing devices that interact with one another to achieve the desired application functionality. In some embodiments, deploying an application on environment 500 comprises installing software and configurations on one or more virtual computing devices that interact with services installed on the virtual computing devices (e.g., search service, repository service, application host service, etc.).

In some embodiments, an application is deployed from an application package onto environment 500. In some embodiments, an application package comprises a set of software and configurations to be installed onto one or more virtual machines. In some embodiments, an application is deployed onto environment 500 by a software program using an application package as input. In some embodiments, an application package is deployed using the same software program used to provision environment 500. In some embodiments, an application package is deployed using the same software program used to build an environment template used to provision environment 500. In some embodiments, a software program is able to deploy an application onto environment 500 because it has a standard configuration, e.g., because environment 500 was provisioned from an environment template by a software program. In some embodiments, a software program used for deploying an application onto environment 500 from an application package additionally receives an application configuration as input. In some embodiments, an application configuration comprises a set of configurations to be applied to the application deployment process. In various embodiments, the application configuration configures connections from applications running on virtual machines in a virtual machine cluster to systems outside the virtual machine cluster, the application package to deploy, the target deployment environment, application parameter values, or any other appropriate application parameters.

An application endpoint comprises information needed for applications running in a given environment to interact with systems external to the environment. In various embodiments application endpoints comprise information related to external database systems, applications, email systems, directory servers, web services, or any other appropriate external systems or services.

Figure 6:
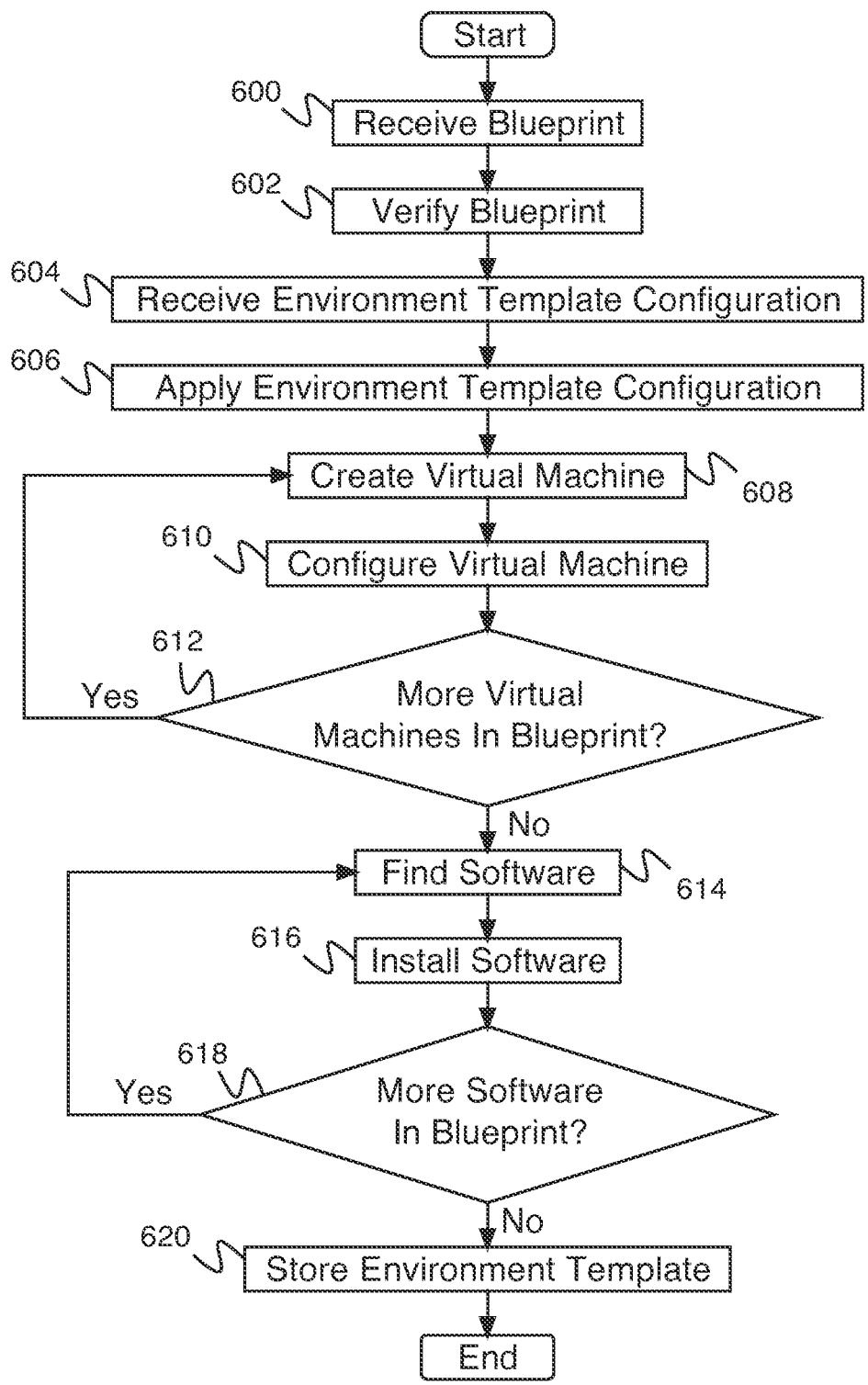
FIG. 6 is a flow diagram illustrating an embodiment of a process for building an environment template.

FIG. 6 is a flow diagram illustrating an embodiment of a process for building an environment template. In some embodiments, the process of FIG. 6 implements build 202 of FIG. 2. In the example shown, in 600, a blueprint is received. In some embodiments, a blueprint is received by an enterprise software client from an enterprise software vendor. In 602, the blueprint is verified. In 604, an environment template configuration is received. In some embodiments, an environment template configuration comprises the identity of a blueprint needed to build the template and other template-specific parameter values. In various embodiments, an environment template configuration specifies a blueprint to consume which configures a list of virtual machine clusters into which software will be installed, a default resource allocation to each virtual machine, a default initial number of virtual machines in a virtual machine cluster, a default minimum number of virtual machines in a virtual machine cluster, a default maximum number of virtual machines in a virtual machine cluster, what software is installed onto virtual machines in a virtual machine cluster, binding of application services to virtual machines in a virtual machine cluster, which virtual machine services in a virtual machine cluster depend on systems outside the virtual machine cluster, the operating system on each virtual machine in a virtual machine cluster, or any other appropriate environment template parameters. In 606, the environment template configuration is applied. In some embodiments, applying the environment template configuration comprises applying a set of changes to properly consume the blueprint.

In 608 a virtual machine is created. In some embodiments, a virtual machine is created as specified in the blueprint. In 610 a virtual machine is configured. In some embodiments, a virtual machine is configured as specified in the blueprint. In 612 it is determined whether there are more virtual machines in the blueprint. If there are more virtual machines in the blueprint, control passes to 608. If there are not more virtual machines in the blueprint, control passes to 614. In 614, software is found. In some embodiments, software is found as specified in the blueprint. In various embodiments, finding software comprises downloading software from a remote server, downloading software from an enterprise software vendor, locating software on a local network, or locating software in any other appropriate location. In 616, software is installed. In some embodiments, software is installed as specified in the blueprint. In some embodiments, software is installed on a virtual machine created in 608. In 618 it is determined whether there is more software in the blueprint. If there is more software in the blueprint, control passes to 614. If there is not more software in the blueprint, control passes to 620. In 620, the environment template is stored. In some embodiments, storing the environment template comprises storing the virtual machines (e.g., the virtual machines created in 608).

Figure 7:
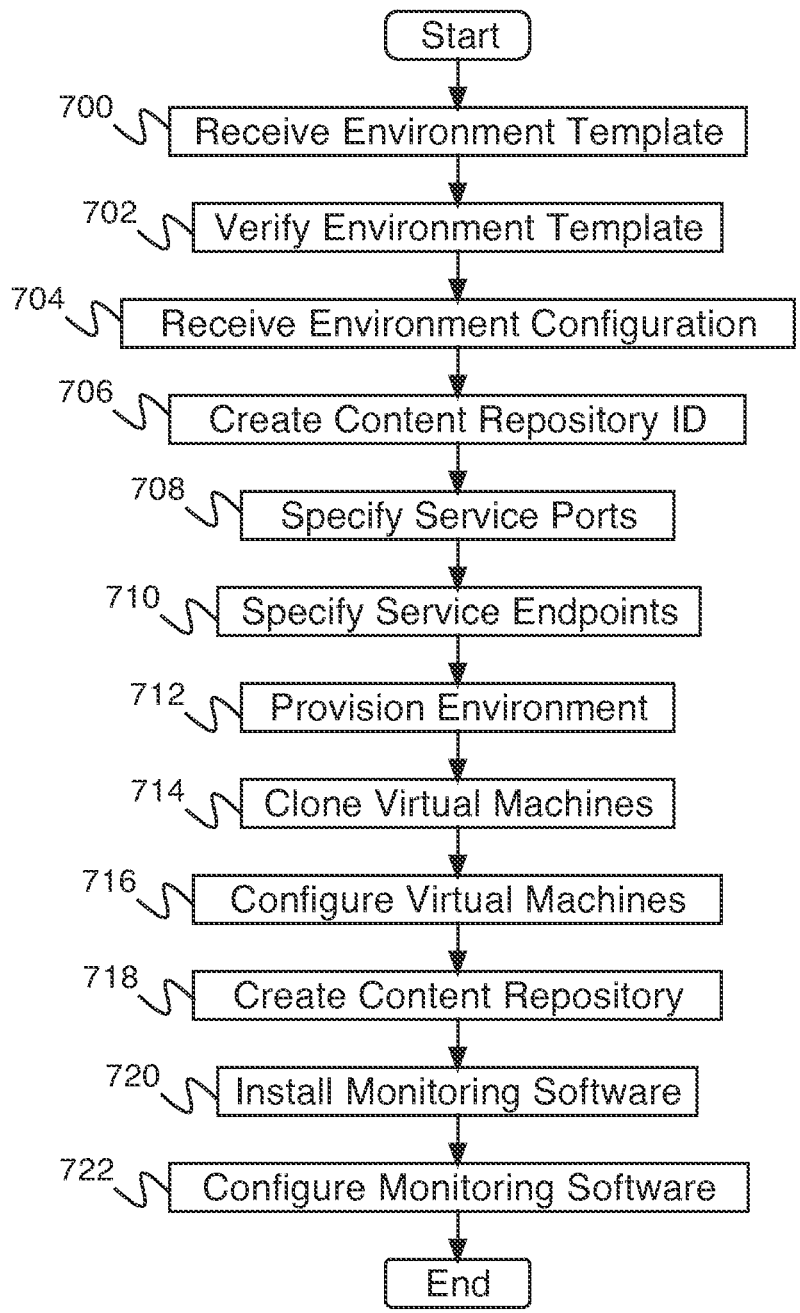
FIG. 7 is a flow diagram illustrating an embodiment of a process for provisioning an environment.

FIG. 7 is a flow diagram illustrating an embodiment of a process for provisioning an environment. In some embodiments, the process of FIG. 7 implements provision 208 of FIG. 2. In the example shown, in 700, an environment template is received. In 702, the environment template is verified. In 704, an environment configuration is received. In some embodiments, an environment configuration comprises a set of instructions for configuring the environment. In some embodiments, the environment configuration specifies the required environment template. In various embodiments, the environment configuration configures environment-specific software values, virtual machine cluster sizes, connections from virtual machines in a virtual machine cluster to systems outside the virtual machine cluster, virtual machine accounts, or any other appropriate environment parameters.

In 706, a content repository identifier (ID) is created. In some embodiments, a content repository ID must be unique (e.g., every content repository has a different content repository ID). In 708, service ports are specified. In some embodiments, service ports comprise ports on which network communications are configured to take place. In 710, service endpoints are specified. In some embodiments, service endpoints comprise network locations of external services (e.g., a database server network location, a print server network location, etc.). In 712, the environment is provisioned. In some embodiments, provisioning the environment comprises requesting virtual hosting space from a virtual computing host. In 714, virtual machines are cloned. In some embodiments, virtual machines are cloned from the environment template to virtual machines comprising the environment. In 716, virtual machines are configured. In various embodiments, virtual machine ports are configured, virtual machine endpoints are configured, virtual machine networking is configured, virtual machine software is configured, or any other appropriate virtual machine configuration is performed. In 718, a content repository is created. In some embodiments, the content repository is created with the content repository ID created in 706. In 720, monitoring software is installed. In 722, monitoring software is configured.

Figure 8:
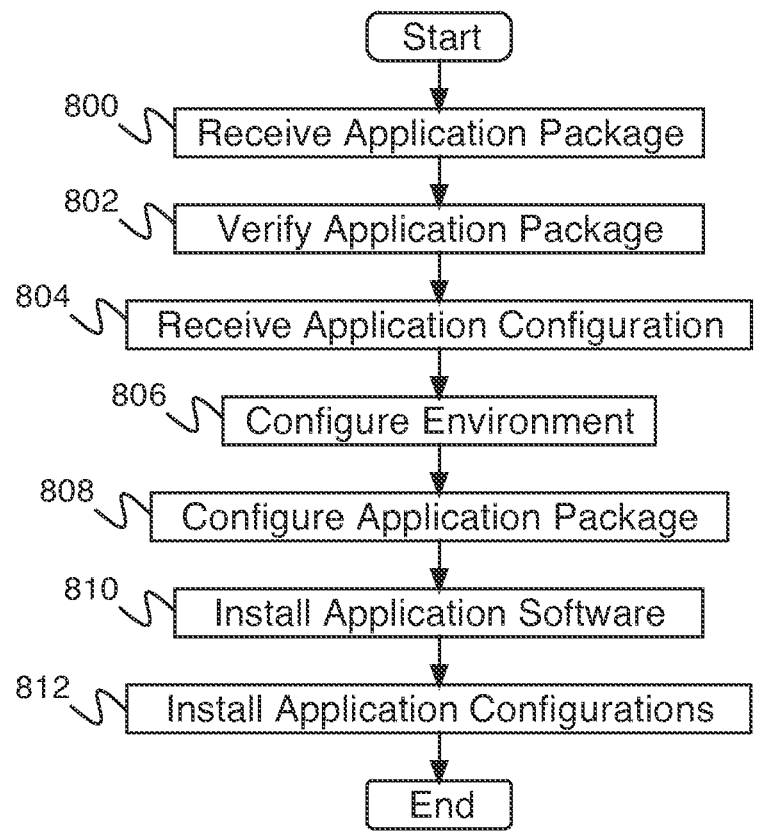
FIG. 8 is a flow diagram illustrating an embodiment of a process for deploying an application.

FIG. 8 is a flow diagram illustrating an embodiment of a process for deploying an application. In some embodiments, the process of FIG. 8 implements deploy 214 of FIG. 2. In the example shown, in 800, an application package is received. In 802, the application package is verified. In 804, an application configuration is received. In some embodiments, an application configuration comprises a set of configurations to be applied to the application deployment process. In various embodiments, the application configuration configures connections from applications running on virtual machines in a virtual machine cluster to systems outside the virtual machine cluster, the application package to deploy, the target deployment environment, application parameter values, or any other appropriate application parameters. In 806, the environment is configured (e.g., according to the application configuration). In 808, the application package is configured (e.g., according to the application configuration). In 810, application software is installed. In various embodiments, application software is installed on one or more virtual machines. In 812, application configurations are installed. In various embodiments, application configurations are installed on one or more virtual machines.

Figure 9:
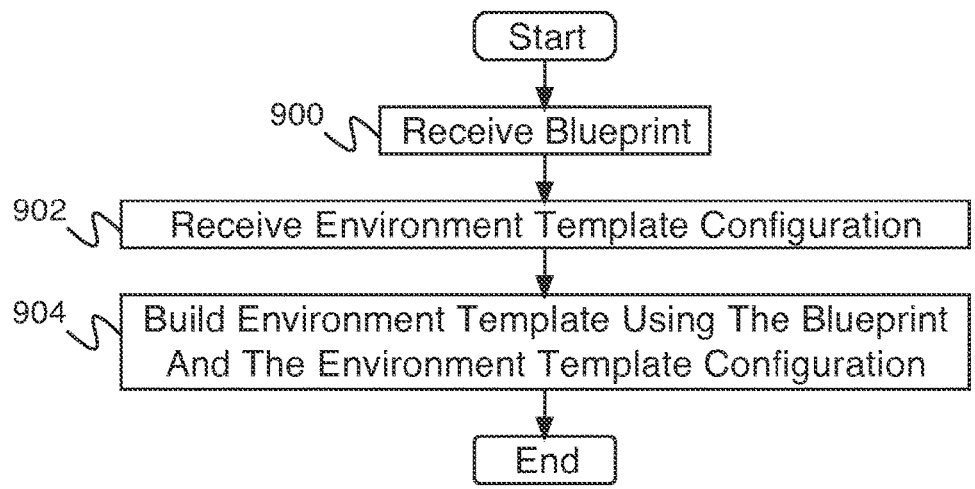
FIG. 9 is a flow diagram illustrating an embodiment of a process for blueprint-driven environment template creation in a virtual infrastructure.

FIG. 9 is a flow diagram illustrating an embodiment of a process for blueprint-driven environment template creation in a virtual infrastructure. In 900, a blueprint is received. In 902, an environment template configuration is received. In 904, an environment template is built using the blueprint and the environment template configuration, wherein the environment template is for provisioning an application, and wherein the environment is for deploying an application.

Figure 10:
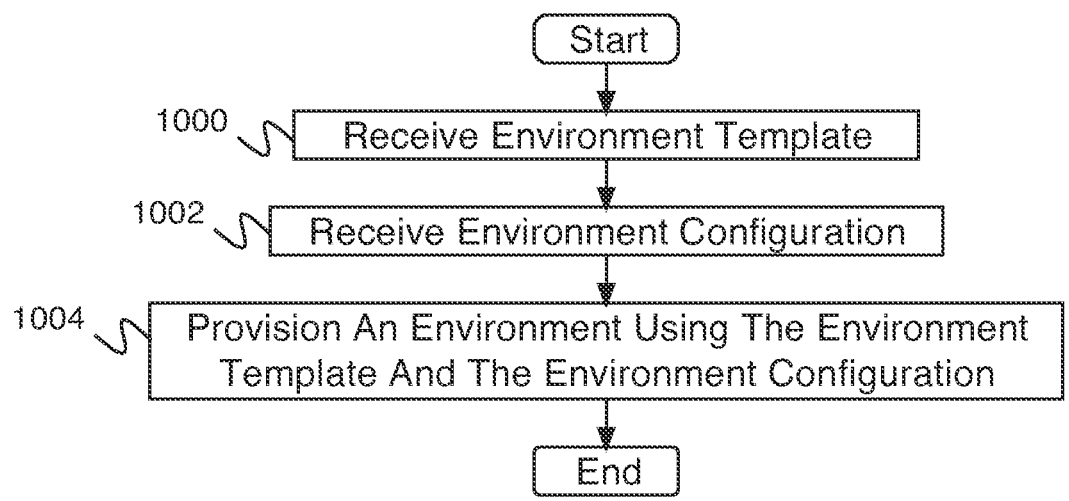
FIG. 10 is a flow diagram illustrating an embodiment of a process for automated provisioning of heterogeneous virtual environments.

FIG. 10 is a flow diagram illustrating an embodiment of a process for automated provisioning of heterogeneous virtual environments. In 1000, an environment template is received. In 1002, an environment configuration is received. In 1004, an environment is provisioned using the environment and the environment configuration, wherein the environment is for deploying an application.

Figure 11:
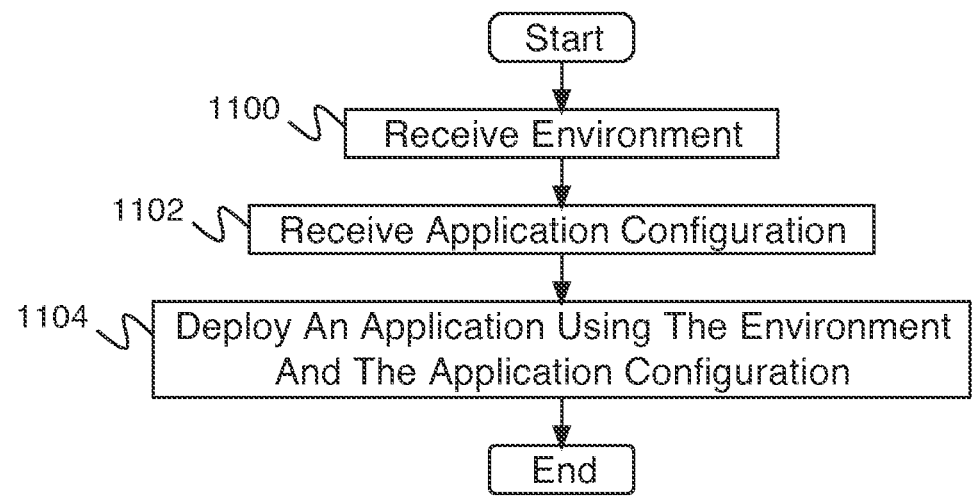
FIG. 11 is a flow diagram illustrating an embodiment of a process for recipe and blueprint-driven automated application deployment.

FIG. 11 is a flow diagram illustrating an embodiment of a process for recipe and blueprint-driven automated application deployment. In 1100, an environment is received. In 1102, an application configuration is received. In 1104, an application is deployed using the environment and the application configuration.

Although the foregoing embodiments have been described in some detail for purposes of clarity of understanding, the invention is not limited to the details provided.

There are many alternative ways of implementing the invention. The disclosed embodiments are illustrative and not restrictive.

The invention claimed is:

1. A system for blueprint-driven environment template creation in a virtual infrastructure, comprising:
an interface configured to:
receive a blueprint; and
receive an environment template configuration; and
a processor configured to:
build an environment template using the blueprint and the environment template configuration, wherein the environment template configuration comprises a set of configurations to be applied to an environment template building process, and wherein the environment template comprises one or more instantiated virtual machines;
receive an environment configuration; and
provision an environment using the environment template and the environment configuration, wherein the environment is for deploying an application, wherein the application is deployed based at least in part on the environment, an application configuration, and an application package, wherein to provision the environment comprises instantiating a content repository that is not comprised as part of the blueprint or the environment template, and configuring one or more connections between the environment and the content repository, and wherein the content repository has an assigned content repository identifier that is unique within at least the environment, and the instantiating the content repository is based at least in part on one or more parameters of the environment configuration; and
a memory coupled to the processor and configured to provide the processor with instructions.

2. A system as in claim 1, wherein the blueprint configures a list of virtual machine clusters into which software will be installed.

3. A system as in claim 1, wherein the blueprint configures a default resource allocation to each virtual machine.

4. A system as in claim 1, wherein the blueprint configures a default initial number of virtual machines in a virtual machine cluster.

5. A system as in claim 1, wherein the blueprint configures a default minimum number of virtual machines in a virtual machine cluster.

6. A system as in claim 1, wherein the blueprint configures a default maximum number of virtual machines in a virtual machine cluster.

7. A system as in claim 1, wherein the blueprint configures what software is installed onto virtual machines in a virtual machine cluster.

8. A system as in claim 1, wherein the blueprint configures binding of application services to virtual machines in a virtual machine cluster.

9. A system as in claim 1, wherein the blueprint configures which virtual machine services in a virtual machine cluster depend on systems outside the virtual machine cluster.

10. A system as in claim 1, wherein blueprint configures the operating system on each virtual machine in a virtual machine cluster.

11. A system as in claim 1, wherein the environment template comprises a minimum install for use by application developers.

12. A system as in claim 1, wherein the environment template comprises an install for application testing purposes.

13. A system as in claim 1, wherein the environment template comprises a full install for running under a full load, wherein to run under the full load includes running in full production, and wherein full production is a version of an application that is different than a version of an application for which an install is used for testing purposes.

14. A system as in claim 1, wherein the environment template configuration specifies a name of the blueprint and a name of the environment template.

15. A system as in claim 1, wherein the environment template comprises a set of instantiated virtual machines each with software components installed as indicated in the blueprint.

16. A system as in claim 1, wherein the application comprises a set of runtime computer program artifacts orchestrated and executed on an ongoing basis to address a particular set of customer requirements.

17. The system of claim of claim 16, wherein the artifacts are placed in a pre-specified location of the provisioned environment during deployment of the application onto the provisioned environment.

18. The system of claim 1, wherein the content repository is associated with the one or more instantiated virtual machines, and has an identifier that is unique across one or more other provisioned environment templates.

19. The system of claim 1, wherein the processor is configured to log each provisioning operation into a log file that is stored to the memory.

20. The system of claim 19, wherein the log file captures the state of the virtual infrastructure.

21. A method for blueprint-driven environment template creation in a virtual infrastructure, comprising:
receiving a blueprint;
receiving an environment template configuration;
building, using a processor, an environment template using the blueprint and the environment template configuration, wherein the environment template configuration comprises a set of configurations to be applied to an environment template building process, and wherein the environment template comprises one or more instantiated virtual machines;
receiving an environment configuration; and
provisioning an environment using the environment template and the environment configuration, wherein the environment is for deploying an application, wherein the application is deployed based at least in part on the environment, an application configuration, and an application package, wherein the provisioning of the environment includes instantiating a content repository that is not comprised as part of the blueprint or the environment template, and configuring one or more connections between the environment and the content repository, and wherein the content repository has an assigned content repository identifier that is unique within at least the environment, and the instantiating the content repository is based at least in part on one or more parameters of the environment configuration.

22. A computer program product for blueprint-driven environment template creation in a virtual infrastructure, the computer program product being embodied in a non-transitory computer readable storage medium and comprising computer instructions for:
receiving a blueprint;
receiving an environment template configuration; and building, using a processor, an environment template using the blueprint and the environment template configuration, wherein the environment template configuration comprises a set of configurations to be applied to an environment template building process, and wherein the environment template comprises one or more instantiated virtual machines;

receiving an environment configuration; and provisioning an environment using the environment template and the environment configuration, wherein the environment is for deploying an application, wherein the application is deployed based at least in part on the environment, an application configuration, and an application package, wherein the provisioning of the environment includes instantiating a content repository that is not comprised as part of the blueprint or the environment template, and configuring one or more connections between the environment and the content repository, and wherein the content repository has an assigned content repository identifier that is unique within at least the environment, and the instantiating the content repository is based at least in part on one or more parameters of the environment configuration.

* * * * *